(12) United States Patent
Aabye et al.

(10) Patent No.: US 12,316,784 B2
(45) Date of Patent: *May 27, 2025

(54) METHOD AND SYSTEM FOR AUTHENTICATION CREDENTIAL

(71) Applicant: Visa International Service Association, San Francisco, CA (US)

(72) Inventors: Andreas Aabye, San Mateo, CA (US); Christopher McMillan, Castle Rock, CO (US); Adam Clark, Bristow, VA (US); Christian Aabye, Redwood City, CA (US); Simon Hurry, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,958

(22) Filed: Oct. 12, 2023

(65) Prior Publication Data

US 2024/0048395 A1 Feb. 8, 2024

Related U.S. Application Data

(63) Continuation of application No. 18/029,068, filed as application No. PCT/US2021/063703 on Dec. 16, 2021, now Pat. No. 11,870,919.

(Continued)

(51) Int. Cl.
*H04L 29/06* (2006.01)
*G06F 21/10* (2013.01)
(Continued)

(52) U.S. Cl.
CPC .......... *H04L 9/3268* (2013.01); *G06F 21/105* (2013.01); *G06F 21/33* (2013.01); *H04L 9/3247* (2013.01)

(58) Field of Classification Search
CPC ..... H04L 9/3268; H04L 9/3247; H04L 9/006; H04L 9/3265; H04L 63/0823;
(Continued)

(56) References Cited

U.S. PATENT DOCUMENTS 9,959,576 B2 5/2018 Hurry
2003/0212639 A1* 11/2003 Cronce .................. G06F 21/105
705/57

(Continued)

FOREIGN PATENT DOCUMENTS

CN 107743067 A 2/2018
CN 110247884 A 9/2019
(Continued)

OTHER PUBLICATIONS

Poller, Andreas, et al. "Electronic identity cards for user authentication-promise and practice." IEEE Security & Privacy Magazine 10.1 (2012): 46-54. (Year: 2012).*

(Continued)

*Primary Examiner* — Ka Shan Choy
(74) *Attorney, Agent, or Firm* — Kilpatrick Townsend & Stockton LLP

(57) ABSTRACT

An issuing authority (IA) may validate the identity of a user and issue a digital license to the user. IA may generate IA public-private key pair, and provide IA public key to the certification authority (CA). IA may sign the digital license with IA private key, and provision the signed digital license on the user device. IA may request CA to certify the digital license. CA may use IA public key to validate the digital license, and sign IA public key with CA private key, thereby generating a digital certificate associated with the issuing authority that is linked to the digital license. A relying party may use CA public key to validate the digital license. The (Continued)

relying party can retrieve the information from the digital license and trust that the retrieved information is legitimate.

20 Claims, 6 Drawing Sheets

Related U.S. Application Data

(60) Provisional application No. 63/225,313, filed on Jul. 23, 2021, provisional application No. 63/127,515, filed on Dec. 18, 2020.

(51) Int. Cl.
*G06F 21/33* (2013.01)
*H04L 9/32* (2006.01)

(58) Field of Classification Search
CPC ....... G06F 21/105; G06F 21/33; G06Q 20/02; G06Q 20/38215; G06Q 20/4014; G06Q 50/18
See application file for complete search history.

(56) References Cited

U.S. PATENT DOCUMENTS

| | | |
|---|---|---|
| 2005/0021956 A1 | 1/2005 | Genty et al. |
| 2005/0144437 A1* | 6/2005 | Ransom .................... G06F 1/28 700/286 |
| 2005/0223415 A1 | 10/2005 | Oho et al. |
| 2007/0168657 A1 | 7/2007 | Carro |
| 2007/0180496 A1* | 8/2007 | Fransdonk ............. G06Q 20/12 726/3 |
| 2008/0209207 A1 | 8/2008 | Parupudi et al. |
| 2014/0074721 A1* | 3/2014 | Al-Herz ................ H04L 9/3263 705/71 |
| 2015/0339664 A1* | 11/2015 | Wong .................. H04L 63/0823 705/71 |
| 2018/0007037 A1 | 1/2018 | Reese |
| 2018/0219678 A1 | 8/2018 | Medvinsky et al. |
| 2018/0316505 A1* | 11/2018 | Cohen .................... G16H 10/60 |
| 2018/0324176 A1 | 11/2018 | Campagna et al. |
| 2018/0373847 A1 | 12/2018 | Lo et al. |
| 2019/0089546 A1 | 3/2019 | Garcia Morchon et al. |
| 2019/0394052 A1 | 12/2019 | Li et al. |
| 2020/0204372 A1 | 6/2020 | Ngo et al. |
| 2021/0184864 A1* | 6/2021 | Wentz .................. H04L 9/3218 |

FOREIGN PATENT DOCUMENTS

| | | |
|---|---|---|
| WO | 2006073250 A2 | 7/2006 |
| WO | 2020223319 A1 | 11/2020 |

OTHER PUBLICATIONS

Application No. CN202180067717.6, Notice of Decision to Grant, Mailed On Sep. 19, 2023, 6 pages.

PCT/US2021/063703, "International Preliminary Report of Patentability (Chapter II of the Patent Cooperation Treaty)", May 12, 2023, 5 pages.

Application No. PCT/US2021/063703, International Search Report and Written Opinion, Mailed On Apr. 7, 2022, 12 pages.

Poller et al., "Electronic Identity Cards For User Authentication-Promise And Practice", IEEE Security & Privacy Magazine, vol. 10, Issue 1, Oct. 6, 2011, pp. 46-54.

Application No. EP21907782.3, Extended European Search Report, Mailed On Apr. 30, 2024, 8 pages.

\* cited by examiner

METHOD AND SYSTEM FOR AUTHENTICATION CREDENTIAL

CROSS-REFERENCES TO RELATED APPLICATIONS

This application is a continuation application of U.S. patent application Ser. No. 18/029,068, filed Mar. 28, 2023, which is a 371 application of International Application of PCT Application No. PCT/US2021/063703, filed on Dec. 16, 2021 which claims benefit under 35 USC § 119(e) to U.S. Provisional Patent Application No. 63/127,515 filed on Dec. 18, 2020 titled "Method and System for Authentication Credential" and U.S. Provisional Patent Application No. 63/225,313 filed on Jul. 23, 2021, titled "Method and System for Digital License", the disclosures of which are incorporated by reference herein in their entirety for all purposes.

BACKGROUND

An issuer of identifying information (e.g., a DMV, a medical service provider, city, state or federal government agency) provides data about a person (user) to be used in a transaction. However, the issuer is not necessarily known by a relying party (e.g., a merchant) and can therefore not be guaranteed as authentic. Not all transactions may occur in a location with a stable connection to an online authenticating service. Furthermore, even if there were an online authenticating service, the authenticity of the authentifying service would also have to be verified. Current solutions would require other forms of verification, such as providing the physical driver's license, vaccination record, or other type of certification which may reveal more information about the user than is needed for the transaction.

Embodiments are directed to addressing these and other problems, individually and collectively.

BRIEF SUMMARY

Embodiments enable offline authentication of an issuing authority of a digital license. Offline issuer authentication allows for a high level of trust to be maintained in a transaction where a relying party may not know the issuer. A digital certificate generated by a certification authority may be associated with (e.g., integrated or appended to) a digital license may authenticate the issuing authority of the digital license.

Embodiments provide a method performed by a certification authority computer of a certification authority. The method comprises authenticating an issuing authority, receiving an issuing authority public key from an issuing authority computer of the issuing authority, digitally signing the issuing authority public key using a private key of the certification authority, and generating a digital certificate associated with the issuing authority. The digital certificate includes the digitally signed issuing authority public key. The method further comprises transmitting the digital certificate to a recipient to associate the digital certificate with a digital license generated by the issuing authority, and sharing a certification authority public key with one or more parties adapted to receive the digital license and the associated certificate from a holder of the digital license.

Embodiments further provide a certification authority computer associated with a certification authority, the certification authority comprising one or more processors and a memory coupled to the one or more processors. The memory stores instructions that, when executed by the one or more processors, cause the one or more processors to: authenticate an issuing authority, receive an issuing authority public key from the issuing authority, digitally sign the issuing authority public key using a private key of the certification authority, generate a digital certificate associated with the issuing authority, transmit the digital certificate to a recipient to associate the digital certificate with a digital license generated by the issuing authority; and share a certification authority public key with one or more parties adapted to receive the digital license and the associated certificate from a holder of the digital license. According to various embodiments, the digital certificate includes the digitally signed issuing authority public key.

Embodiments also provide a method performed by a relying party computer associated with a relying party. The method comprises receiving, from a certification authority, a certification authority public key and receiving, from a user device, a digital license issued by an issuing authority. The digital license includes a digital certificate signed by the certification authority using a certification authority private key. The certification authority private key is paired with the certification authority public key. The method also includes verifying the certificate using a certification authority public key. The certificate includes an issuing authority public key. The method further includes verifying information contained in the digital license using the issuing authority public key.

Further details regarding embodiments of can be found in the Detailed Description and the Figures.

DETAILED DESCRIPTION

Figure 1:
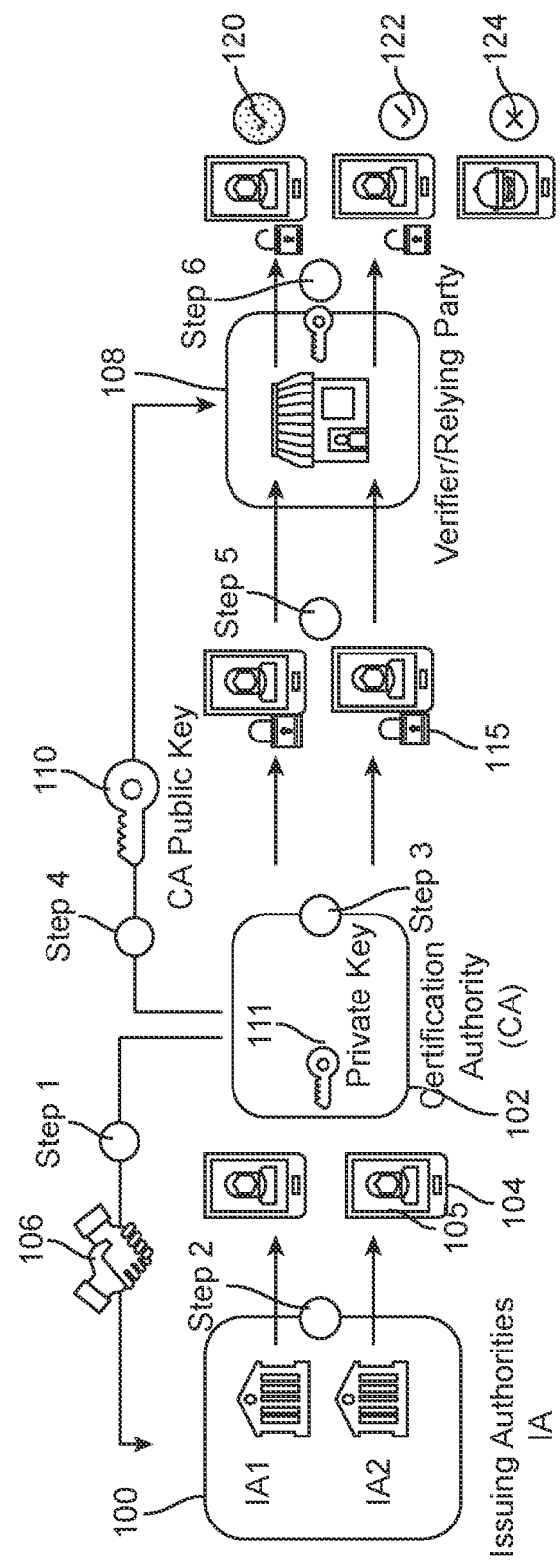
FIG. 1 shows a diagram for issuing and verifying a digital license according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that may be shared openly and publicly. The public key may be designed to be shared and may be configured such that any information encrypted with the public key may only be decrypted using a private key associated with the public key (i.e., a public/private key pair).

A "private key" may include any cryptographic key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a certification authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

A "digital signature" may include any electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the authority that issued credentials (e.g., a digital license) associated with the digital signature.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "certificate" or "digital certificate" may include an electronic document and/or data file. In some cases, the certificate or the digital certificate may be a device certificate. In some embodiments, a digital certificate may use a digital signature to bind a public key with data associated with an identity. A digital certificate may be used to prove the ownership of a public key. The certificate may include one or more data fields, such as the legal name of the identity, a serial number of the certificate, a valid-from and valid-to date for the certificate, certificate related permissions, etc. A certificate may contain a "valid-from" date indicating the first date the certificate is valid, and a "valid-to" date indicating the last date the certificate is valid. A certificate may also contain a hash of the data in the certificate including the data fields. A certificate can be signed by a certification authority. For example, a digital certificate may be provided by a certification authority in connection with a digital license provided by an Issuing Authority. The digital certificate may help to authenticate the Issuing Authority.

A "certification authority" may include an entity that issues digital certificates. A certification authority may prove its identity using a certification authority certificate, which includes the certification authority's public key. A certification authority certificate may be signed by another certification authority's private key or may be signed by the same certification authority's private key. The latter is known as a self-signed certificate. The certification authority may maintain a database of all certificates issued by the certification authority. The certification authority may maintain a list of revoked certificates. The certification authority may be operated by an entity, for example, a processing network entity, an issuer, an acquirer, a central bank etc.

An "Issuing Authority" may include an entity that issues credentials to a user, typically using an issuing entity computer to do so. An issuing entity may be a governmental agency, a medical service provider, a document repository, an access administrator, etc. An issuing entity may also issue credentials in form of a digital license stored on a user device, such as a cellular telephone, smart card, tablet, or laptop to the user.

A "user" may include an individual or a computational device. In some embodiments, a user may be associated with one or more personal accounts and/or user devices (e.g., mobile devices).

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" is typically a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "machine-readable code" may include any images or symbols that can be read through an electronic device for interpretation and manipulation by a computer. Some examples of machine-readable codes include barcodes, quick response (QR) codes, Military Spec UID codes, and any other suitable code.

A "communication channel" can include a medium through which message(s) can be provided. A communication channel can include a physical transmission medium (e.g., a wire, a contact interface, etc.), an over-the-air communication medium (e.g., using electromagnetic signals, etc.), a logical medium (e.g., application programming interfaces (APIs), etc.), and/or a combination thereof.

A "transaction" may be any interaction or exchange between two or more parties. For example, a transaction may include a first entity requesting resources from a second entity. In this example, the transaction is completed when the resources are either provided to the first entity or the transaction is declined.

An "interaction" may include a reciprocal action or influence that involves more than one actor. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like.

An "access device" may be any suitable device that provides access to a remote system. An access device may also be used for communicating with a coordination computer, a communication network, or any other suitable system. An access device may generally be located in any suitable location, such as at the location of a relying party. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, barcode readers, QR code readers, and the like. In some embodiments, the access device may comprise a reader, a processor, and a computer-readable medium. An access device may use any suitable contact or contactless mode of operation to send or receive data from, or associated with, a user device. For example, access devices can have card readers that can include electrical contacts, radio frequency (RF) antennas, optical scanners, bar code readers, or magnetic stripe readers to interact with user devices.

An "access request" may include a request for access to a resource. The resource may be a physical location (e.g., concert venue, apartment building, office space), a physical resource (e.g., good), a digital resource (e.g., electronic document, electronic data, etc.), or a service. In some cases, an access request may be submitted by transmission of an access request message that includes access request data. Typically, a device associated with a requestor may transmit the access request message to a device associated with a relying part in charge of granting the requested access.

"Access credential" may include any suitable data that can be used to access a resource or create data that can access a resource. A credential may be a string of numbers, letters, or any other suitable characters, as well as any object or document that can serve as confirmation. In some embodiments, access data could include data that can be used to access a location or to access secure data. Such information may be a driver's license, a vaccination record, a national passport, a medical prescription, a recreational license, a recreational permit, a voter registration confirmation, an identification document to access a building, ticket information for an event, data to access a building, transit ticket information, passwords, biometrics or other credentials to access secure data, etc. According to various embodiments, the access credential(s) may be provided in form of a digital license provisioned on a user device. For example, the digital license may be provisioned on the user device by an issuing authority that issued the digital license. In some embodiments, the digital license may be provisioned on the user device by an authenticating authority that authenticates the issuing authority and/or the digital license.

Details of some embodiments will now be described in greater detail.

Embodiments associate a digital certificate with a digital license provisioned on a user device. The digital license is generated by an issuing authority (IA) and signed using a private key of the issuing authority (IA private key). The issuing authority may share a public key of the issuing authority (IA public key) with the certification authority. The digital certificate including the IA public key may then be generated by a certification authority (CA), and associated with the digital license. The certification authority may include a globally trusted authority.

The user may present the digital license to a relying party as part of an interaction with the relying party. For example, the user may wish to gain access to a location (e.g., a concert venue, a foreign country, a secure building) managed by the relying party, that requires a certain set of credentials (e.g., a ticket, a vaccination record, a passport, an identity card). In other embodiments, the user may present the digital license as a proof of authorization (e.g., a digital driver's license, fishing license). The relying party may receive a public key of the certification authority (CA public key) from the certification authority. Upon receiving the digital license associated with the digital certificate, the relying party may decrypt the digital certificate using the CA public key to obtain the information contained therein. For example, the issuing authority public key (IA public key) may be embedded in the digital certificate. The relying party may retrieve the IA public key, decrypt the digital license using the IA public key, and obtain the information in the digital license. The relying party may trust the veracity and accuracy of the information retrieved from the digital license because the relying party trusts the certification authority. The digital certificate issued by the certification authority may in turn vouches for the identity of the issuing authority. Therefore, the relying part may trust the veracity and accuracy of the information retrieved from the digital license.

FIG. 1 shows a diagram for issuing and verifying a digital license according to various embodiments. According to various embodiments, the digital license may include one or more of a driver's license, a vaccination passport, a regular passport, a medical prescription, a recreational license, a recreational permit, a voter registration confirmation, an identification document to access a building, among other things.

According to various embodiments, a digital license 105 may be issued to a user as a digital license by an issuing authority (e.g., an issuing entity) 100. The digital license 105 may be signed using a private key of the issuing authority (the IA public key of the IA public-private key pair). In some embodiments, the digital license 105 may be provisioned on a user's device 104 by the issuing authority 100. The issuing authority 100 may share a public key of the issuing authority (IA public key of the IA public-private key pair) with a certification authority 102.

The certification authority 102 may authenticate the issuing authority 100. In some embodiments, the certification authority 102 may receive a request from the issuing authority 100 for authenticating the issuing authority 100. The certification authority 102 may then interact with the issuing authority 100 to collect and verify information about the issuing authority 100 as part of authenticating the issuing authority 100. For example, the certification authority 102 may receive, from the issuing authority 100, information associated with an identity of the issuing authority 100. The certification authority 102 may verify the information associated with the identity of the issuing authority as part of authenticating the issuing authority 100. Upon identifying (and verifying) the identity of the issuing authority, the certification authority 102 may determine a set of authentication steps based on the identity of the issuing authority 100. According to various embodiments, the certification authority 102 may perform a first set of authentication steps for authenticating a first issuing authority 100 and may perform a second set of authentication steps that is different that the first set of authentication steps for authenticating a second issuing authority. For example, a state's Department of Motor Vehicles (DMV) issuing driver's licenses to users may be associated with a different set of authentication steps than a medical service provider issuing vaccination records. The set of authentication steps may depend based on the identity of the issuing authority 100 or a type of certification issued by the issuing authority 100. The certification authority 102 may authenticate the issuing authority 100 based on the set of authentication steps associated with the issuing authority 100.

After authenticating the issuing authority 100, the certification authority 102 may generate a digital certificate 115 to be associated with the digital license 105 issued by the issuing authority 100. According to various embodiments, the certification authority 102 may authenticate the issuing authority 100 prior to or after receiving a request to issue the digital certificate.

According to various embodiments, the certification authority 102 may generate a CA public-private key pair having a CA public key 110 and a corresponding CA private key 111. The certification authority 102 may store the CA public-private key pair at a storage. The certification authority 102 may digitally sign (e.g., incorporate additional data, a hash to) the IA public key component using the CA private key 111 of the CA public-private key pair, thereby generate a digital certificate 115 including the IA public key signed with CA private key 111. In some embodiments, the certification authority 102 may return the digital certificate 115 to the issuing authority 100 for the issuing authority 100 to associate the digital certificate 115 with the digital license 105 issued by the issuing authority 100. In other embodiments, the certification authority 102 may associate the digital certificate 115 with the digital license 105 on the user device 104.

The certification authority 102 may share the CA public key 110 of the CA public-private key pair with one or more relying parties that may need to verify the digital certificate issued by the issuing authority 100. A relying party (e.g., a verifier) 108 may be able to validate or authenticate the issuing authority 100 and/or the digital license 105 using a CA public key 110 of the CA public-private key pair. That is, the relying party may validate or authenticate the issuing authority 100 and/or the contents of the digital license 105 based on the identity of the certification authority 102. For example, the digital license 105 issued to the user (e.g., holder of the digital license) may include an identification card. A relying party such as an employer, an airline operator, or a security guard at the entrance of a stadium may confirm the validity of the digital identification card as described herein. Accordingly, embodiments enable digitizing the physical licenses in a secure and reliable way. Moreover, embodiments prevent the use and dissemination of fraudulent licenses.

According to various embodiments, two separate entities (e.g., the relying party and the issuing authority) may validate each other. For example, in the United States, the driver's licenses are issued by a state's Department of Motor Vehicles (DMV). While each state may recognize each other's DMV within the United States, an entity in a foreign country may not recognize a state DMV or even the state itself. When a person receives a driver's license from, for example, Wyoming DMV, a relying party in Japan does not have any means for confirming the information or even recognizing Wyoming DMV as a reliable source. Embodiments provide a public key infrastructure (PKI) model where a certification authority receives data from the issuing authority, validates that the issuing authority and the received data are legitimate. A globally trusted certification authority underwrites the information provided by the issuing authority. The certification authority acts as a trusted intermediary that enables a transfer of trust or a chain of trust that can securely validate that the information is received from (e.g., the issuing authority) or is queried by (e.g., the relying party) a legitimate entity.

According to various embodiments, the certification authority 102 performs the vetting of the issuing authority 100 (e.g., a medical service provider, a government branch providing a driver's license, a national passport, etc.) prior to generating any digital certificates. The requirements for vetting the issuing authority 100 may depend on the type of license being provided by the issuing authority 100 or depend on an identity (e.g., type) of the issuing authority 100. For example, validating an entity providing identity information by a government branch as the issuing authority may have a different set of requirements than validating an entity providing medical information by a medical service provider (e.g., hospital, doctor's office, pharmacy).

The certification authority 102 generates a CA private-public key pair. While the certification authority 102 keeps the CA private key 111 secret to sign the issuing authority's public key (e.g., IA public key), the certification authority 102 provides the CA public key 110 to the relying parties 108 that need to access and/or use the information on the digital license 105. Through the process of validation or verification of the information on the digital license 105, the relying party 108 is able to trust the IA public key as a legitimate issued public key and therefore the relying party 108 is able to validate that the piece of information retrieved from the digital license 105 has been provided by a legitimate source.

According to various embodiments, an issuing authority 100 may request a certification authority 102 to issue a digital certificate 115 for the issuing authority. The certification authority 102 may validate the issuing authority 100 using one or more authentication and verification processes. An exemplary authentication and verification process may include a set of steps that need to be performed by the certification authority 102 and/or the issuing authority 100, and may depend on a type or identity of the issuing authority 100, or a type of a digital license issued by the issuing authority 100.

The issuing authority 100 may then issue a digital license 105 to a user. Prior to issuing the digital license 105, the issuing authority 100 may validate the identity of the user. The issuing authority 100 may generate an IA public-private key pair, and provide the IA public key to the certification authority 102. The issuing authority 100 may sign the digital license 105 with the IA private key, and provision the signed digital license 105 on the user device 104 (e.g., on an electronic wallet of the user device).

The certification authority 102 signs the IA public key using with the certification authority's own private key (e.g., the CA private key 111), thereby generating a digital certificate 115 verifying that the issuing authority 100 is a legitimate source. The certification authority 102 may provide the digital certificate 115 to the issuing authority 100, which may provision the digital certificate 115 to be associated with the digital license 105 on a digital wallet of the user device 104. When presented to a verifier/relying party 108, the relying party 108 may use the CA public key 110 to validate the digital certificate 115 signed with the CA private key 111. The relying party 108 can then retrieve the IA public key from the digital certificate 115. The relying party 108 can trust that the IA public key is trusted based on the IA public key being signed using the CA private key 111 (e.g., the certification authority 102 is a globally trusted entity, or the certification authority 102 is an entity trusted by the relying party 108). The relying party 108 can then retrieve the information from the digital license 105 and trust that the issuing authority 100 that issued the information is legitimate.

FIG. 1 also illustrates a series of steps for generating and validating a digital license. At step 1, the certification authority 102 verifies legitimacy of one or more issuing authorities 100 and establishes a trusted relationship with each issuing authority 100. The certification authority 102 may generate the CA public-private key pair and sign the digital certificate requests from the trusted issuing authorities 100 using the CA private key 111. According to various embodiments, the issuing authority 100 may include one or more of a medical service provider, a government entity issuing forms of identification such as a driver's license, a passport, a national ID, an agency issuing tickets such as a public transportation ticket, an airline ticket, or an admission ticket (e.g., a concert admission ticket, or a building admission card). The issuing authority 100 may share an IA public key with the certification authority 102, and perform authentication steps required by the certification authority 102 to authenticate itself to the certification authority 102.

At step 2, the issuing authority 100 may generate a digital license 105 signed with IA private key. According to various embodiments, the issuing authority 100 may provision the digital license 105 on an electronic wallet of the user device 104 (e.g., user mobile device). The digital license 105 may be provisioned remotely and may be updated as necessary (e.g., upon expiration, when information is changed or updated, etc.) by the issuing authority 100. The user may be able to request modification to the information associated with the digital license 105 to add or remove temporary or permanent information such as disability status, temporary address, etc. According to various embodiments, the communication between the user device 104 and the issuing authority 100 may use a new communication standard (e.g., ISO/IE CTS 23220-3).

At step 3, the certification authority 102 may digitally sign the IA public key with the CA private key 111 thereby generating a digital certificate 115 for the issuing authority 100. For example, the digital certificate 115 may certify the legitimacy or authenticity of the issuing authority 100. In some embodiments, the certification authority 102 may update the digital license 105 directly on the user device 104 to be associated with the digital certificate 115, which is digitally signed (e.g., "locked") using the CA private key 111, establishing the legitimacy of the issuing authority 100. The digital certificate 115 may include the IA public key digitally signed with CA private key 111. For example, the certification authority 102 may receive, from the user device 104, a request for certifying the digital license 105 provisioned on the user device 104. The certification authority 102 may transmit the digital certificate 115 to the user device 104 to be linked to the digital license 105 on the user device 104.

In other embodiments, the certification authority 102 may return the digital certificate 115 to the issuing authority 100 for the issuing authority 100 to link the digital certificate 115 with the digital license 105. The issuing authority 100 may receive the digital certificate 115 prior to or during the generation of the digital license 105. The issuing authority 100 may associate (e.g., link) the digital certificate 115 with the digital license 105.

At step 4, the certification authority 102 may provide the CA public key 110 to one or more relying parties 108 that are adapted to receive the digital license 105 and the associated digital certificate 115 from the user (e.g., holder of the digital license). The one or more relying parties 108 may be interoperable with all trusted issuing authorities globally. The certification authority 102 may support both off-line and online digital authentication by the relying entity. For example, the certification authority 102 may send the CA public key 110 to the relying party 108, and the relying party 108 may store the CA public key 110 at a secure location. Alternatively, the certification authority 102 may store the CA public key 110 in a storage (e.g., cloud storage) accessible to the relying party 108. The certification authority 102 may inform the relying party 108 about how to retrieve the CA public key 110 from the cloud or remote storage. For example, the certification authority 102 may transmit access credentials to the storage to the relying party 108. In some embodiments, the certification authority 102 may provide the CA public key 110 to the relying party 108 upon request from the relying party 108.

According to various embodiments, the involvement of the certification authority 102 may mitigate counterfeit ID fraud and reduce reliance on manual checks that require specialized and localized knowledge. The certification authority 102 may ensure the legitimacy of the issuing authority 100 that issued the digital license 105.

At step 5, the user presents the digital license 105 associated with the digital certificate 115 to the relying party 108.

The relying party 108 may retrieve the CA public key 110 to retrieve and/or verify the authenticity of the IA public key. The relying party 108 may then use the IA public key to retrieve the information contained in the digital license 105. According to various embodiments, the user may provide the digital license 105 to the relying party 108 via any suitable means including but not limited to communication via Bluetooth, NFC, Wi-Fi or using a machine-readable code (e.g., QR code). The relying party 108 may use a dedicated mobile application installed on a terminal, or a dedicated terminal (e.g., access device) to receive and verify the data from the user/user device. The data transfer between the user device 104 and the relying party terminal may be an offline data transfer.

According to various embodiments, the user may choose all or a subset of the information on the digital license 105 to provide to the relying party 108. For example, the provided information may comply with ISO 18013-5 standard. The relying party computer may have detected (e.g., through an identifier on the user device 104) that the digital license 105 is associated with the digital certificate 115 issued by the certification authority 102. The relying party 108 may then retrieve the CA public key 110 and decrypt the digital certificate 115 to obtain the IA public key, and thereafter decrypt the digital license 105 to obtain the information contained therein. If the series of decryption and/or verifications is successful, the relying party 108 may now trust that the issuing authority 100 is legitimate as it is associated with the trusted certification authority 102. In some cases, the relying party computer may also contact the certification authority 102 to determine if the details of the digital certificate 115 are still valid. The relying party 108 may rely on a single trusted entity (e.g., the certification authority 102) to confidently authenticate IDs from all participating jurisdictions globally.

As described above, the certification authority 102 validates the authenticity of the issuing authority 100 using the public-private key infrastructure of the certification authority 102. According to various embodiments, the certification authority 102 does not authenticate the user who is presenting the digital license 105 to the relying party 108. It is the issuing authority 100 that authenticates the user prior to issuing the digital license 105 to the user. The certification authority 102 authenticates the issuing authority 100.

According to various embodiments, the certification authority 102 may provide a mobile application (e.g., a software application, an "app") on the user device 104. The digital license 105 and the digital certificate 115 may be provisioned on the mobile application instead of the electronic wallet. Alternatively, as explained above, the digital license 105 and the digital certificate 115 may be provisioned on the electronic wallet of the user device 104. Yet in some embodiments, the digital license 105 may be provisioned on the electronic wallet and the digital certificate 115 may be provisioned on the certification authority app on the user device 104.

Figure 2:
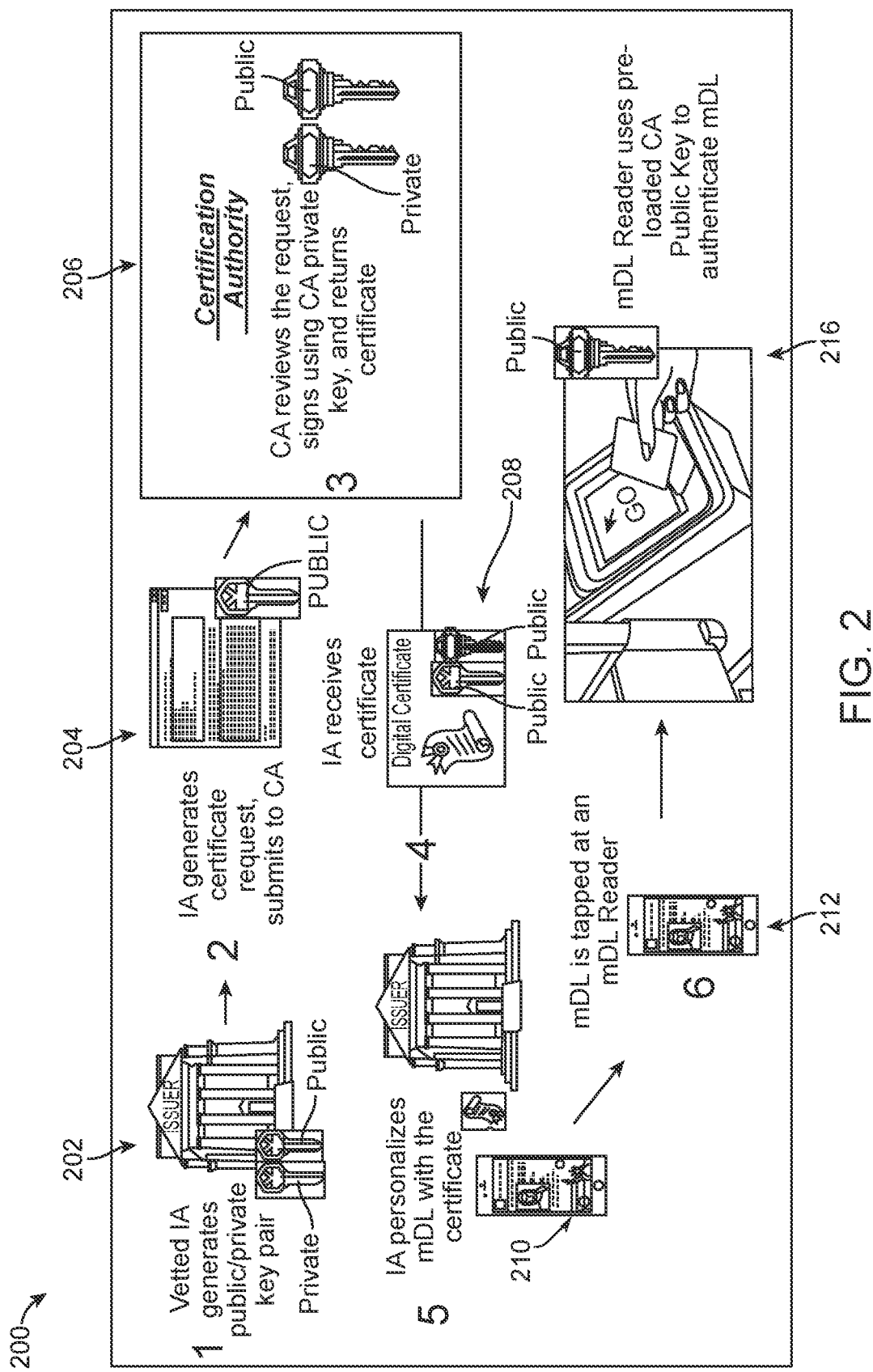
FIG. 2 shows another diagram for issuing and verifying a digital license according to various embodiments.

FIG. 2 illustrates another diagram for issuing and verifying a digital license according to various embodiments. The issuing authority 202 may be vetted (e.g., authenticated, verified) by a certification authority 206. According to an exemplary embodiment, the digital license may be a mobile driver's license (mDL). As such, FIG. 2 may illustrate a method of generating and/or verifying a user's mDL data provided to a relying party 216 by the user and/or the mDL. The previously provisioned data (e.g., IA certificate, mDL certificate, CA public key) held by the mDL and the relying party 216 is used in order to perform an offline verification of the user's personal data. One of ordinary skill in the art will understand that the use of a mDL is for illustrative purposes only and should not be construed limiting. The flow 200 illustrated in FIG. 2 may be applied to other digital licenses, including but not limited to a vaccination passport, a regular passport, a medical prescription, a recreational license, a recreational permit, a voter registration confirmation, an identification document to access a building.

At step 1, the vetted issuing authority 202 may generate an IA public-private key pair. At step 2, the issuing authority 202 may transmit a certificate request 204 to the certification authority 206 requesting the certification authority 206 to generate a certificate (e.g. a digital certificate) for a digital license that is being issued by the issuing authority 202. The certificate request 204 may include the IA public key. At step 3, the certification authority 206 may review the certificate request 204 received from the issuing authority 202, confirm that the issuing authority is vetted/authenticated, and digitally sign the provided information (e.g., the IA public key) using CA private key, and thereby generate a digital certificate 208. The CA public-private key pair may be generated, for example, using elliptic curve cryptography. The certification authority 206 may store the CA public-private key pair (or at least the CA private key) at a secure database managed by the certification authority 206. The certification authority 206 provides a copy of the CA public key to the relying party 216. For example, the certification authority 206 may provision the CA public key on a computer of the relying party 216 for the relying party 216 to securely store the CA public key. Alternatively, the certification authority 206 may store the CA public key at a cloud storage accessible by the relying party 216.

The certification authority 206 may return the digital certificate 208 to the issuing authority 202. At step 4, the issuing authority 202 receives the digital certificate 208 from the certification authority 206. At step 5, the issuing authority 202 generates a digital license 210 (or retrieves a previously generated digital license) personalizes the digital license 210 with the digital certificate 208. For example, the issuing authority 202 associates the digital certificate 208 received from the certification authority 206 with the digital license 210 generated by the issuing authority 202. The issuing authority 202 then provisions the digital license 210 along with the digital certificate 208 on a user device 212. According to various embodiments the user device might be a mobile phone or a smart device (e.g., a smart card, smart phone, etc.). At step 6, the user presents the digital license 210 and the digital certificate 208 to a terminal of the relying party 216 via the user device 212. The relying party 216 retrieves the CA public key to decrypt the digital certificate 208 and retrieve the IA public key, thereby authenticating the issuing authority 202. The relying party 216 may then then retrieve the data in the digital license 210 using the IA public key. Therefore, the relying party 216 can trust the authenticity of the digital license 210 issued by the issuing authority 202.

For example, the relying party 216 may be a merchant that needs to check the age of a user prior to providing goods or services to the user. When the user presents the user device to a terminal of the relying party, the mobile driver's license sends the digital certificate (generated by the certification authority 206, and that includes the digitally signed IA public key) to the relying party computer. The digital certificate may be of any suitable format such as X.509 format which includes, among other things: a certificate version number, a serial number, an issuer name, a validity period, subject public key information, and a signature.

The relying party computer may detect (e.g., through an identifier on the card) that the mobile driver's license is associated with the certification authority 206, and retrieve the CA public key. The relying party computer may use the CA public key to verify that the IA public key was signed by the CA private key. The relying party computer then extracts the IA public key from the digital certificate, and may verify that the digital license was signed using the private key of the IA. If the verification is successful, the relying party computer may now trust that the issuing authority 202 is legitimate as it has been authenticated by the trusted certification authority 206. In some cases, the relying party computer may also contact the certification authority 206 to determine if the details of the digital certificate are still valid.

In some embodiments, the user device or an application on the user device may use mDL data (e.g., name, expiration date, IA signed information), which may be encrypted by industry standard means (e.g., ISO 18013-5) such as by a user credential private key, to create a dynamic signature (e.g., using an mDL private key) if required by the transaction and send the signature to the relying party. The dynamic signature is a signature only valid for a single authentication to protect the user from data cloning.

Figure 3:
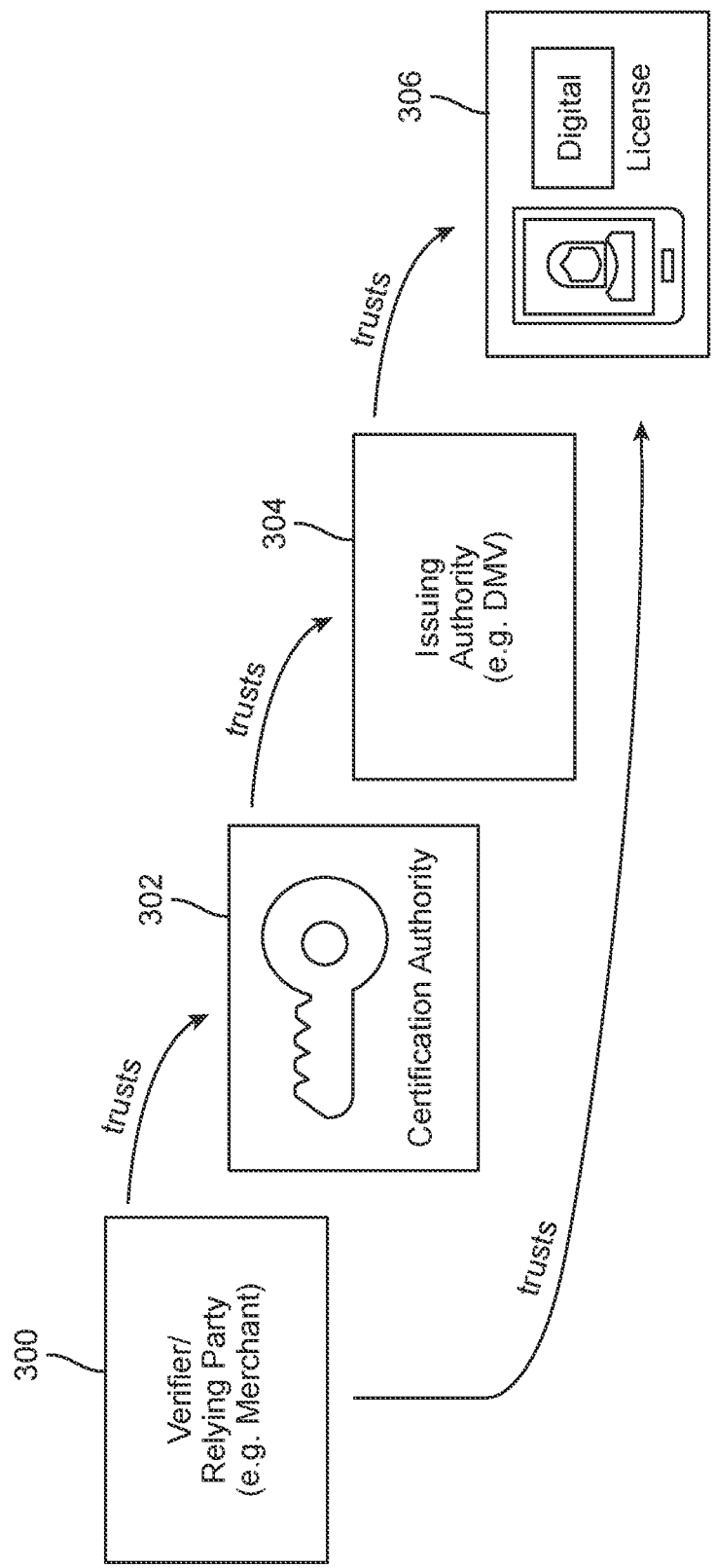
FIG. 3 shows a chain of trust among a relying party, a trusted third party (e.g., a certification authority), an issuing authority, and a digital license.

FIG. 3 shows the chain of trust between the parties described in FIGS. 1 and 2. A public key algorithm may be used to verify information between the different parties. A relying party 300 (e.g., a merchant, transit terminal operator) trusts a certification authority 302 (e.g., a third party) and stores or otherwise accesses the CA public validation key to be retrieved during a later transaction. The certification authority 302, and the relying party 300 by extension of the chain of trust, trusts an issuing authority 304 (e.g., a medical service provider, a government entity issuing identifications). According to various embodiments, the certification authority 302 may vet the issuing authority 304 to ensure that the issuing authority 304 is legitimate. The issuing authority 304 trusts the digital license 306 as being the issuer thereof, and by extension the relying party 300 is able to trust the digital license 306. This chain of trust allows the relying party 300 to trust that the data provided through the digital license 306 is legitimate. Accordingly, the relying party 300 can trust the digital license 306 without an online connection to the issuing authority 304 by following the process described herein in connection with at least FIGS. 1 and 2.

Figure 4A:
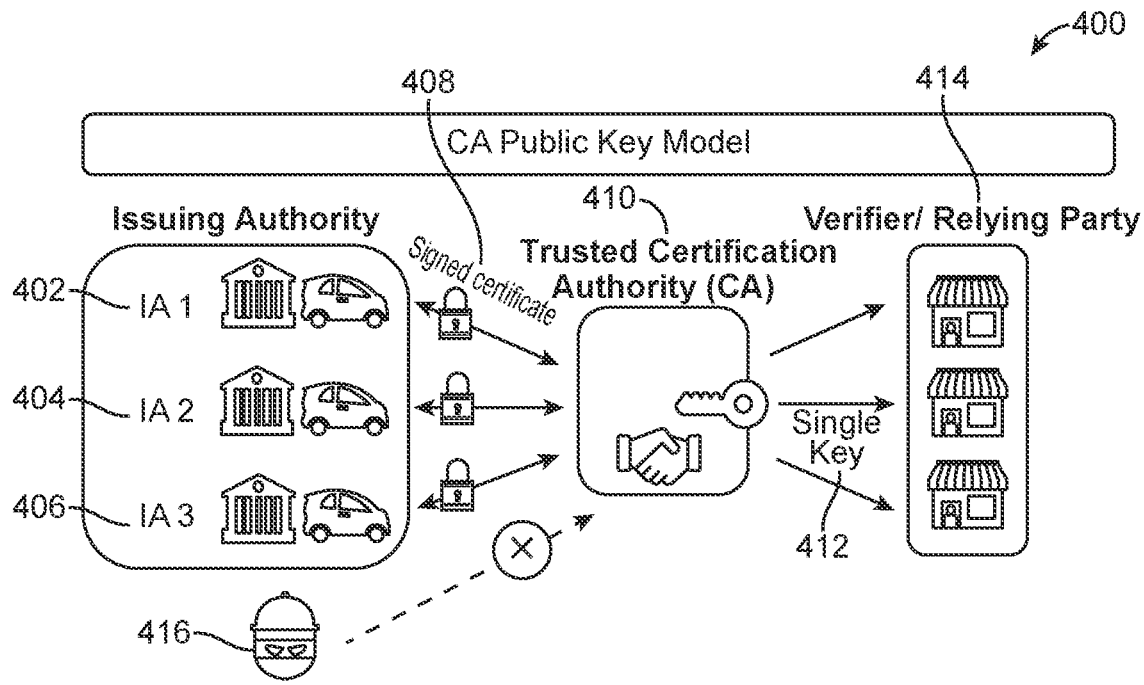
FIG. 4A illustrates the certification authority private key infrastructure (PKI) model, according to various embodiments.
Figure 4B:
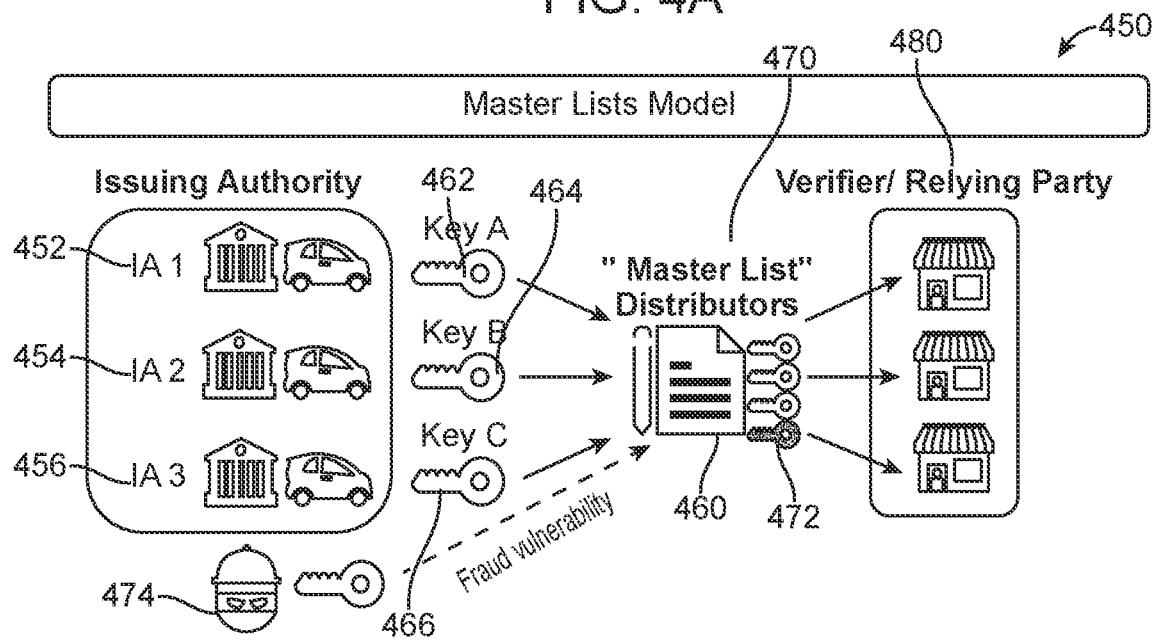
FIG. 4B illustrates a master list model, according to various embodiments.

The certification authority may authenticate the issuing authority and vouch for the issuing authority in any suitable manner. For example, the certification authority may use a private key infrastructure (PKI) model, as shown in FIG. 4A. In some embodiments, the certification authority may use a master list model, as shown in FIG. 4B.

FIG. 4A illustrates the certification authority private key infrastructure (PKI) model 400, according to various embodiments. There are a large number of issuing authorities 402, 404, 406 worldwide (e.g., state DMVs; national, state or local governments; national or local medical service providers, etc.). Without the benefits provided by the embodiments described herein, the relying parties 414 would have to keep a continuous, up-to-date list of all and legitimate issuing authorities 402, 404, 406 and their public keys IA1, IA2, IA3, while keeping illegitimate keys out of the list, which is an expensive and difficult task. Using a PKI solution, the relying parties 414 would only have to maintain updated connections to a single globally trusted certification authority 410 rather than all issuing authorities.

The globally trusted certification authority 410 has a private-public key pair. The certification authority interacts with and validates/authenticates an issuing authority as legitimate. The certification authority may then receive the IA public key of the authenticated issuing authority and sign the IA public key with the CA private key, thereby generating a digital certificate 408 for the issuing authority. The certification authority 410 may send the digital certificate 408 to the corresponding issuing authority 402, 404, 406, who would then associate the digital certificate 408 with the digital license generated by the respective issuing authority 402, 404, 406. For example, when the car rental agency in Japan (as an exemplary relying party 414) wants to validate the authenticity of a digital driver's license issued by the state of Missouri in USA, the car rental agency would validate the digital certificate associated with the digital driver's license using the globally-trusted CA public key 412 shared with the car rental agency by the certification authority 410, allowing the car rental agency to trust the issuing authority 402, 404, 406 in a cryptographically secure way.

The globally trusted certification authority 410 validates issuing authorities 402, 404, 406 as legitimate using a PKI scheme, adds intra-national and global scale and trust, and allows relying parties 414 to trust the legitimacy of the issuing authority 402, 404, 406 behind a digital license. Without proper wetting of an issuing authority (such as the fraudulent issuing authority 416), the certification authority 410 may refuse to sign the IA public key and generate a digital certificate for the unauthenticated issuing authority 416. The relying parties 414 only have to maintain connection with a central certification authority 410 rather than hundreds of issuing authorities 402, 404, 406. The issuing authority 402, 404, 406 benefits from reduced fraud and increased acceptance of the digital license that it issues. The users have the benefit of using their digital license at a wide variety of geographies as opposed to a localized system.

FIG. 4B illustrates a master list model 450, according to various embodiments. In the master list model 450, all issuing authorities 452, 454, 456 store their public keys 462, 464, 466, on a master list 460 that may be stored on a remote server (e.g., on the cloud). A master list distributor (e.g., a certification authority 470) may then sign the master list (instead of each individual IA public key 462, 464, 466) using the master list distributor private key. The relying parties 480 then check that the master list 460 is genuine using the master list distributor public key, and retrieve the relevant IA public key 462, 464, 466 from the master list 460. Under the master list model, a digital certificate is not associated with the digital license. Rather, the master list distributor certifies the master list 460 of IA public keys. The master list model may be applicable to cases where an issuing authority would not allow the digital license to be modified or certified by a third party, such as the certification authority 470. According to various embodiments, multiple master list distributors may be needed for global coverage. The master list distributors must implement strong, consistent and scalable controls and governance to validate legitimacy of each self-signing issuing authority and prevent key spoofing (e.g., prevent a fraudulent issuing authority 474 inserting a fraudulent IA public key 472 in the master list 460).

Figure 5:
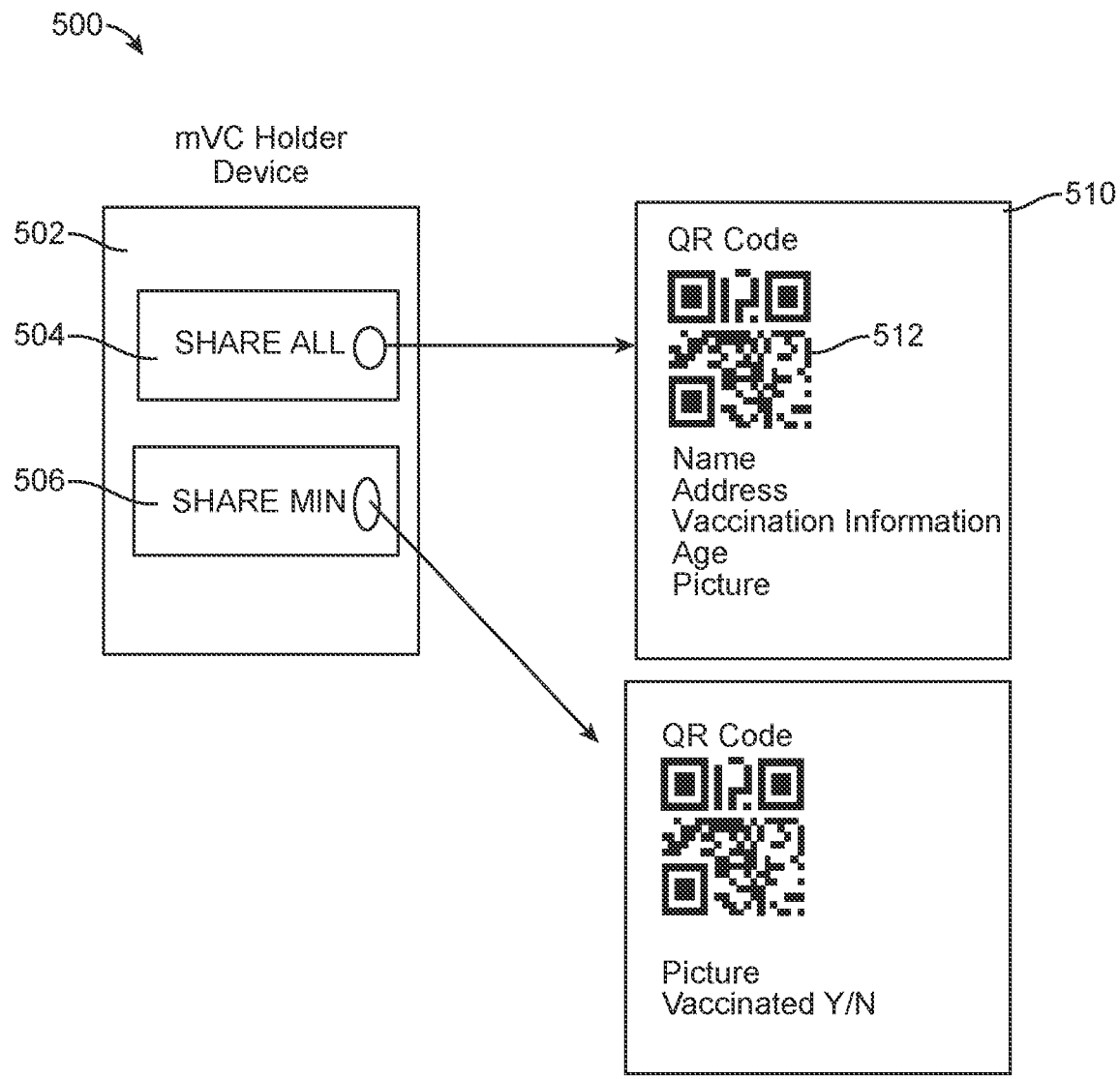
FIG. 5 illustrates an exemplary use case of a digital license, according to various embodiments.

FIG. 5 illustrates an exemplary use case of a digital license according to various embodiments. According to the exemplary use case, the digital license may include a mobile vaccination card 502 (e.g. a digital vaccination passport) provisioned on a user device 500 by an issuing authority (e.g. a local medical service provider). The local medical service provider may validate the identity of the user, administer the required vaccination, and issue a mobile vaccination card 502 (mVC) to the user device 500 of the user. The mVC 502 may include a variety of information including but not limited to the user identifying information (e.g. user name, user date of birth, user picture), vaccine identifying information (e.g. maker, lot number, serial number, administration date, dose number, ingredients). The local medical service provider may sign the mVC 502 with a IA private key. A certification authority may verify and establish secure communications with the local medical service provider. The certification authority may then validate the local medical service provider and may sign the IA public key of the local medical service provider using the CA private key. The certification authority may generate a digital certificate and provide the digital certificate to the local medical service provider to be provisioned on the user device 500 as associated with the mVC 502. Alternatively, the certification authority may update the mVC 502 provisioned on the user device 500 with the digital certificate generated by the certification authority. According to various embodiments, the certification authority may provide a mobile application for digital licenses. In some embodiments, the digital licenses (and the associated digital certificate issued by the certification authority) may be provisioned on the digital wallet of the user device.

The certification authority may share the CA public key with relying parties. The certification authority may also provide the mobile verification application to the relying parties, as needed. When the user presents their mVC to a relying party, the relying party may use the CA public key to authenticate the local medical service provider by retrieving the IA public key, and may then retrieve and verify the information stored on the mVC 502 using the IA public key. The relying party may use the same mobile verification application to verify the mVC of multiple users.

As shown in FIG. 5, the user may select the type, level and content of information that will be shared with the relying party. For example, the user may choose whether to release all data 504 or a subset of the data 506 with the relying party. The user may decide what information to share depending on an identity of the relying party. For example, while sharing all data at a customs checkpoint may be appropriate, only releasing minimum data as a condition to entry at a restaurant may be enough. The relying party's mobile application 510 may receive the information (e.g., by reading a machine readable code 512) from the user device.

Figure 6:
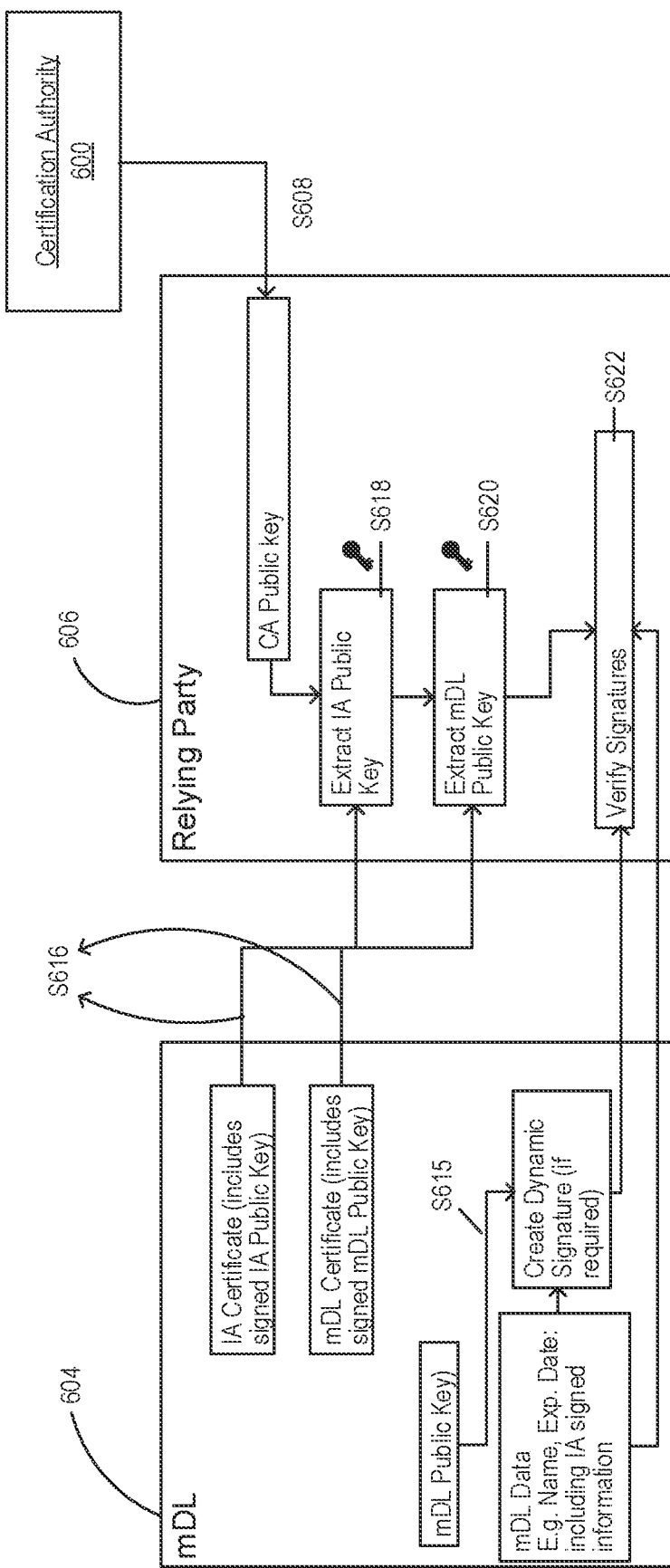
FIG. 6 illustrates a flowchart of steps, according to various embodiments.

FIG. 6 illustrates a flowchart of steps, according to various embodiments. At step S608, a certification authority 600 may share a CA public key with a relying party 606. As explained above, the certification authority 600 may send the CA public key directly to the relying party 606. Otherwise, the certification authority 600 may store the CA public key at a cloud storage accessible by the relying party 606.

An issuing authority may request a certificate from the certification authority 600. The request may include the IA public key. The certification authority 600 may interact with the issuing authority to collect and verify information about the issuing authority as part of authenticating the issuing authority. For example, the certification authority 600 may authenticate the issuing authority using set of authentication steps. In some embodiments, the certification authority 600 may first identify an identity of the issuing authority. The certification authority 600 may then determine a set of authentication steps based on the identity of the issuing authority or a type of certification issued by the issuing authority. The certification authority 600 may authenticate the issuing authority based on the set of authentication steps associated with the issuing authority. According to various embodiments, a first set of authentication steps may be performed for authenticating a first issuing authority (e.g. a government entity) and a second set of authentication steps that is different that the first set of authentication steps is performed for authenticating a second issuing authority (e.g. a local medical service provider).

The certification authority 600 may generate a digital certificate associated with the issuing authority, and transmit the digital certificate to a recipient to associate the digital certificate with a digital license generated by the issuing authority. The recipient may be the issuing authority. The digital certificate includes the digitally signed IA public key that is digitally signed using the CA private key. For example, the certification authority 600 may embed the digitally signed IA public key in the digital certificate.

The issuing authority 602 associates the digital certificate with the digital license generated by the issuing authority 602. The issuing authority 602 provisions (or otherwise transmits) the digital license associated with the digital certificate to the user device 604.

At optional step S615, the user device 604 (via a software application stored on the user device 604) may sign the digital license and the digital certificate with a private key (e.g. a digital license application private key) prior to sharing the digital license with a third party (e.g., a relying party 606). That is, the user device 604 may generate a dynamic signature.

At step S616, the user device 604 may transmit the digital license with the digital certificate to the relying party 606. The digital license is associated with (e.g. includes) a digital certificate signed by the certification authority using a CA private key, which is paired with CA public key. As provided above, the relying party 606 may have received (or otherwise retrieve) the CA public key.

At step S618, the relying party 606 may verify (e.g. decrypt) the digital certificate using the CA public key and retrieve the IA public key from the decrypted digital certificate.

At optional step S620, the relying party 606 may extract the digital license using the digital license application public key.

At step S622, relying party 606 may retrieve and verify the information contained in the digital license using the IA public key. The relying party may verify the signatures of the issuing authority in the certification authority as well as the information contained in the digital license. According to various embodiments, a detail level of the information contained in the digital license may depend on an identity of the relying party 606.

As described above, the digital certificate and the digital license is stored, or installed on a mobile device. In some embodiments, the mobile device may allow a user to gain access to a location or secure data. The exemplary mobile device may comprise a computer readable medium that can be present within the body of the mobile device. The computer readable medium may be in the form of a memory that stores data. In some cases, the memory may also store information such as a digital license associated with a digital certificate. In general, any of this information may be transmitted by the mobile device to another device, using any suitable method, including the use of antenna or contactless element. The body may be in the form a plastic substrate, housing, or other structure.

In some embodiments, the mobile device may further include a contactless element, which is typically implemented in the form of a semiconductor chip (or other data storage element) with an associated wireless transfer (e.g., data transmission) element, such as an antenna. Contactless element may be coupled to (e.g., embedded within) the mobile device and data or control instructions that are transmitted via a cellular network may be applied to the contactless element by means of a contactless element interface (not shown). Contactless element may be capable of transferring and receiving data using a short range wireless communication capability. The mobile device may comprise components to both receive and send data. Thus, the mobile device may be capable of communicating and transferring data or control instructions via both cellular network (or any other suitable wireless network—e.g., the Internet or other data network) and short range communications.

The mobile device may also include a processor (e.g., a microprocessor) for processing the functions of the mobile device and a display to allow a consumer to see phone numbers and other information and messages. The mobile device may further include input elements to allow a user to input information into the device, a speaker to allow the user to hear voice communication, music, etc., a microphone to allow the user to transmit their voice through the mobile device, and a camera to take pictures or scan machine-readable codes. The mobile device may also include an antenna for wireless data transfer (e.g., data transmission).

The memory may be in the form of one or more memory devices (e.g., RAM, EEPROM, ROM chips), using any suitable mode of data storage. In some embodiments, the memory in the mobile device may also include a secure storage area for storing sensitive data such as the digital license associated with the digital certificate. For example, the memory may be part of or may contain a secure element.

A computer (e.g., a certification authority computer) according to various embodiments comprises a processor and a memory. A network interface and a non-transitory computer readable medium may be coupled to the processor.

The processor may be implemented as one or more integrated circuits (e.g., one or more single core or multicore microprocessors and/or microcontrollers). The processor can execute a variety of programs in response to program code or computer-readable code stored in a computer-readable medium. The processor may include functionality to maintain multiple concurrently executing programs or processes. The memory can store a plurality of applications executable by the processor, as well as a public/private key pair generated by the computer.

The network interface may be configured to connect to one or more communication networks to allow the computer to communicate with other entities (e.g., external computers, issuing authority computer, relying party computer, user device). Some examples of the network interface may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface may include Wi-Fi™. Data transferred via the network interface may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 808 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Computer-readable medium may comprise one or more non-transitory media for storage and/or transmission. Suitable media include, as examples, a random-access memory (RAM), a read only memory (ROM), a magnetic medium such as a hard-drive, or an optical medium such as a CD (compact disk) or DVD (digital versatile disk), flash memory, and the like. The computer-readable medium may be any combination of such storage or transmission devices. The computer-readable medium may be embodied by any number of non-volatile memories (e.g., flash memory) and volatile memories (e.g., DRAM, SRAM), or any other non-transitory storage medium, or a combination of media.

According to various embodiments, the computer-readable medium may store instructions that, when executed by the processor, cause the processor to authenticate an issuing authority; receive an issuing authority public key from the issuing authority; digitally sign the issuing authority public key using a private key of the certification authority; generate a digital certificate associated with the issuing authority, wherein the digital certificate includes the digitally signed issuing authority public key; transmit the digital certificate to a recipient to associate the digital certificate with a digital license generated by the issuing authority; and share a certification authority public key with one or more parties adapted to receive the digital license and the associated digital certificate from a holder of the digital license.

Embodiments provide various advantages. According to various embodiments, the digital license provisioned on a user device may also be used during mobile wallet provisioning. The digital license may be used to match an account holder and device holder data during provisioning of the account on the user device, therefore limiting the ability to provision a token with fraudulent information on the user device. In some embodiments, the digital license may be used to validate and link an account or loan application to the submitter, reducing the opportunity for fraud using stolen identities. In other embodiments, a digital license and a merchant authentication process allows for the automation of age verification and reduction in the number of illegitimate/illegal purchases and activities related to, for example, alcohol & tobacco purchases; bar, club, casino admittance; vehicle rentals, etc. The digital license may also be used in the airline industry to link the device owner with the boarding documents on their mobile device, as well as streamline the traditional ID verification process and reduce the use of fraudulent IDs for travel. Notaries are responsible for ensuring the identity of every signer and can be subject to civil or criminal liability if they fail to do so. The digital license presents the opportunity to validate and more strongly link documents to their holders, removing notary risk and reducing notarization of fraudulent information. Additional use cases include secure building access, traffic stops, job eligibility verification, prescription and drug purchases, voter registration, government programs, recreational licenses and permits.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of embodiments will become apparent to those skilled in the art upon review of the disclosure. The scope should, therefore, be determined not with reference to the above description, but instead should be determined with reference to the pending claims along with their full scope or equivalents.

One or more features from any embodiment may be combined with one or more features of any other embodiment without departing from the scope.

As used herein, the use of "a," "an," or "the" is intended to mean "at least one," unless specifically indicated to the contrary.

What is claimed is:

1. A method comprising:
   transmitting, by an issuing authority computer associated with an issuing authority, an issuing authority public key to a certification authority computer associated with a certification authority;
   receiving, by the issuing authority computer from the certification authority computer, a digital certificate associated with the issuing authority, wherein the digital certificate includes a digitally signed issuing authority public key using a certification authority private key;
   authenticating, by the issuing authority computer, a user;
   generating, by the issuing authority computer, a digital license for the user upon successfully authenticating the user, wherein the digital license is signed using an issuing authority private key;
   associating, by the issuing authority computer, the digital certificate with the digital license; and
   transmitting, by the issuing authority computer, the digital license associated with the digital certificate to the user.

2. The method of claim 1, wherein a certification authority public key is shared with one or more parties adapted to receive the digital license and the digital certificate from a holder of the digital license.

3. The method of claim 1, further comprising:
   provisioning, by the issuing authority computer, the digital license associated with the digital certificate on a user device of the user.

4. The method of claim 1, further comprising:
   appending, by the issuing authority computer, the digital certificate to the digital license.

5. The method of claim 1, wherein the digital license comprises one or more of a driver's license, a vaccination passport, a regular passport, a medical prescription, a recreational license, a recreational permit, a voter registration confirmation, an identification document to access a building.

6. The method of claim 1, wherein a detail level of information obtained by decrypting the digital license using the issuing authority public key depends on an identity of a relying party decrypting the digital license.

7. The method of claim 1, further comprising:
   transmitting, by the issuing authority computer, authenticating information to the certification authority computer; and
   transmitting, by the issuing authority computer, the issuing authority public key to the certification authority computer upon successfully completing authentication with the certification authority using a set of authentication steps.

8. The method of claim 7, wherein the set of authentication steps depends on one or more of an identity of the issuing authority or a type of digital license issued by the issuing authority.

9. An issuing authority computer associated with an issuing authority, the issuing authority computer comprising:
   one or more processors; and
   a memory coupled to the one or more processors and storing instructions that, when executed by the one or more processors, cause the one or more processors to:
      transmit an issuing authority public key to a certification authority computer associated with a certification authority;
      receive, from the certification authority computer, a digital certificate associated with the issuing authority, wherein the digital certificate includes a digitally signed issuing authority public key using a certification authority private key;
      authenticate a user;
      generate a digital license for the user upon successfully authenticating the user, wherein the digital license is signed using an issuing authority private key;
      associate the digital certificate with the digital license; and
      transmit the digital license associated with the digital certificate to the user.

10. The issuing authority computer of claim 9, wherein a certification authority public key is shared with one or more parties adapted to receive the digital license and the digital certificate from a holder of the digital license.

11. The issuing authority computer of claim 9, wherein the instructions, when executed by the one or more processors, further cause the one or more processors to:
    provision the digital license associated with the digital certificate on a user device of the user.

12. The issuing authority computer of claim 9, wherein the instructions, when executed by the one or more processors, further cause the one or more processors to:
    append the digital certificate to the digital license.

13. The issuing authority computer of claim 9, wherein the digital license comprises one or more of a driver's license, a vaccination passport, a regular passport, a medical prescription, a recreational license, a recreational permit, a voter registration confirmation, an identification document to access a building.

14. The issuing authority computer of claim 9, wherein a detail level of information obtained by decrypting the digital license using the issuing authority public key depends on an identity of a relying party decrypting the digital license.

15. The issuing authority computer of claim 9, wherein the instructions, when executed by the one or more processors, further cause the one or more processors to:
   transmit authenticating information to the certification authority computer; and
   transmit the issuing authority public key to the certification authority computer upon successfully completing authentication with the certification authority using a set of authentication steps.

16. The issuing authority computer of claim 15, wherein the set of authentication steps depends on one or more of an identity of the issuing authority or a type of digital license issued by the issuing authority.

17. A relying party computer associated with a relying party, the relying party computer comprising:
   one or more processors; and
   a memory coupled to the one or more processors and storing instructions that, when executed by the one or more processors, cause the one or more processors to:
      receive, from a certification authority, a certification authority public key;
      receive, from a user device, a digital license issued by an issuing authority, wherein the digital license includes a digital certificate signed by the certification authority using a certification authority private key, wherein the certification authority private key is paired with the certification authority public key;
      verify the digital certificate using a certification authority public key, wherein the digital certificate includes an issuing authority public key; and
      verify information contained in the digital license using the issuing authority public key.

18. The relying party computer of claim 17, wherein the instructions, when executed by the one or more processors, further cause the one or more processors to:
   decrypt the digital certificate using the certification authority public key;
   retrieve the issuing authority public key from the decrypted digital certificate; and
   retrieve the information contained in the digital license using the issuing authority public key.

19. The relying party computer of claim 17, wherein the digital license comprises one or more of a driver's license, a vaccination passport, a regular passport, a medical prescription, a recreational license, a recreational permit, a voter registration confirmation, an identification document to access a building.

20. The relying party computer of claim 17, wherein a detail level of the information contained in the digital license depends on an identity of a relying party associated with the relying party computer.

* * * * *